United States Patent
Wittmann et al.

[11] Patent Number: 5,511,018
[45] Date of Patent: Apr. 23, 1996

[54] MULTIPLIER, ESPECIALLY A SERIAL BIT MULTIPLIER, FREE FROM INTERNAL OVERFLOW, AND METHOD FOR PREVENTING INTERNAL OVERFLOW IN A MULTIPLIER

[75] Inventors: Alain Wittmann, Saint Martin d'Hères; Freddy Balestro, Grenoble, both of France

[73] Assignee: France Telecom, Paris, France

[21] Appl. No.: 239,667

[22] Filed: May 9, 1994

[30] Foreign Application Priority Data

May 19, 1993 [FR] France .................. 93 06068

[51] Int. Cl.⁶ ............................................ G06F 7/52
[52] U.S. Cl. ............................. 364/757; 364/754
[58] Field of Search ........................... 364/757, 759, 364/760, 788, 754

[56] References Cited

U.S. PATENT DOCUMENTS

| | | | |
|---|---|---|---|
| 3,956,622 | 5/1976 | Lyon | 364/758 |
| 4,346,451 | 8/1982 | Katayama | 364/746 |
| 5,103,419 | 4/1992 | Toyokura et al. | 364/750.5 |

FOREIGN PATENT DOCUMENTS

| | | |
|---|---|---|
| 309037 | 3/1989 | European Pat. Off. . |
| 61-177544 (A) | 9/1986 | Japan . |

OTHER PUBLICATIONS

K. Pekmestzi et al. "Cellular two's complement serial-pipeline multipliers", Nov. 1979 pp. 575–580 (Radio Electronic Engineer, vol. 49, No. 11, GB).

R. Lyon, "Concise Papers", Apr. 1976, pp. 418–425 (IEEE Transactions on Communications).

Primary Examiner—Roy N. Envall, Jr.
Assistant Examiner—Emmanuel L. Moise
Attorney, Agent, or Firm—Robbins, Berliner & Carson

[57] ABSTRACT

A multiplier for least significant bit first multiplication of a multiplicand coded on n bits by a multiplier coefficient includes a processor which, for each bit of the decimal part of the multiplier coefficient between the least significant bit and the most significant bit, calculates the sum of rank n+1 obtained from partial products of the bit in question with the n bits of the multiplicand and from corresponding sums calculated for the preceding bit or bits of the multiplier coefficient. This prevents internal overflow of the multiplier.

17 Claims, 6 Drawing Sheets

MULTIPLIER, ESPECIALLY A SERIAL BIT MULTIPLIER, FREE FROM INTERNAL OVERFLOW, AND METHOD FOR PREVENTING INTERNAL OVERFLOW IN A MULTIPLIER

BACKGROUND OF THE INVENTION

1. Field of the Invention

The invention concerns binary multiplication, least significant bit first, of a multiplicand by a multiplier coefficient within a multiplier, especially but not exclusively a serial bit multiplier in which the bits of the multiplicand are fed serially to the multiplier input.

2. Description of the Prior Art

Binary multiplication, least significant bit first, of a multiplicand by a multiplier coefficient involves determining, for each bit of the multiplier coefficient after the least significant bit, sums obtained from partial products of said bit in question with the n bits of the multiplicand and from the corresponding sums associated with the preceding bit(s) of the multiplier coefficient.

These sums are calculated in adders which allow for the carries resulting from these operations. The man skilled in the art knows that, generally speaking, given the potential for carries the addition of two numbers on n bits can produce a number on b+1 bits so that it is necessary to take into account for each bit in question of the multiplier coefficient the sum of rank n+1 to be used to calculate some later sums associated with subsequent bits of the multiplier coefficient.

Serial bit multipliers usually operate with a constant dynamic range, i.e. for a multiplicand on n bits only n bits are produced at the output of each adder and at the output of the multiplier.

One solution is then to calculate only n bits in each adder. However, it is then necessary to ensure that the result fits into n bits in order to avoid the problems of internal overflow at intermediate sections in a serial bit multiplier, which could give an erroneous final result.

A solution of this kind is described in the article "Two's Complement Pipeline Multipliers" by R. F. LYON, IEEE Transactions on Communications, April 1976, pages 418–425. This solution has been implemented in a serial bit multiplier which duplicates the sign bit of the operands. This article shows that if the most significant bit of the multiplicand is duplicated (this is the sign bit as the binary number is a signed number in two's complement arithmetic), the various sums of rank n+1 are equal to the sums of rank n calculated, which amounts to saying that the result of each addition fits into n bits. Consequently, in each intermediate section of the multiplier the sum of rank n is merely duplicated to obtain without calculation the sum of rank n+1.

However, a solution of this kind requires the use of an additional bit in the data, which can carry a heavy penalty in the case of highly multiplexed filters. Also, this constraint in respect of the data makes it difficult to model the behaviour of the multiplier in the event of internal overflow, because of non-conformance with duplication of the most significant bit (sign bit) of the multiplicand at the multiplier input; it can cause major stability problems if the multiplier is used to implement recursive filters.

The invention is directed to providing a solution to this problem.

An object of this invention is to enable the use of two's complement coded data without duplication of the sign bit and in particular to propose a serial bit multiplier whose behavior conforms in all respects to the requirements of two's complement arithmetic.

SUMMARY OF THE INVENTION

The invention consists in a multiplier for least significant first multiplication of a multiplicand coded on n bits by a multiplier coefficient, said multiplier comprising processor means adapted for each bit of the decimal part of said multiplier coefficient between said least significant bit and the most significant bit to calculate the sum of rank n+1 obtained from partial products of said bit in question and the n bits of said multiplicand and from corresponding sums calculated for the preceding bit or bits of said multiplier coefficient, in order to prevent internal overflow of said multiplier.

In other words, according to the invention, the result of each addition on n bits is not calculated merely by duplicating the sum of rank n to obtain the sum of rank n+1; instead the result of each addition on n+1 bits is calculated by actually calculating the sum of rank n+1, in such a way as to avoid any internal overflow in the multiplier and to eliminate the need for duplication of the most significant bit of the multiplicand, which avoids the need to use an additional data bit and consequently the need to increase the size of the data transmission medium and the input/output registers. Also, although particularly advantageous in the case of serial bit multipliers, the invention applies equally to parallel bit multipliers.

Said sum of rank n+1 and the sum of rank n are advantageously calculated simultaneously and in one embodiment of the invention said sum of rank n+1 is calculated for each bit in question of the multiplier coefficient starting from the complemented carry of rank n.

In another aspect, the invention consists in a multiplier for least significant bit first multiplication of a multiplicand coded on n bits by a multiplier coefficient. According to a general feature of the invention the multiplier includes processing means adapted, for each bit of the decimal part of the multiplier coefficient between the least significant bit and the most significant bit, to calculate the sum of rank n+1 obtained from the partial products of said bit in question and the n bits of the multiplicand and from the corresponding sums calculated for the preceding bit or bits of the multiplier coefficient, in such a way as to avoid any internal overflow in the multiplier.

In one embodiment of the invention, in which the multiplier is a serial bit multiplier including a plurality of successive multiplier sections connected in series, each section being adapted to receive a predetermined bit of the multiplier coefficient and in succession all the bits of the multiplicand, the processing means include elementary processing means respectively incorporated into the intermediate sections of the multiplier at least and adapted to calculate the respective sum of rank n+1 for the corresponding predetermined bit of the multiplier coefficient associated with the corresponding section.

In one embodiment of the invention at least each section from the second onwards includes means for calculating successive carries associated with the sums of successive ranks and each elementary processing means is adapted to calculate the corresponding sum of rank n+1 from the complemented carry of rank n.

The calculating means of each section advantageously comprise an adder including a first input adapted to receive the successive partial products of the bit of the multiplier coefficient associated with said section and the bit of the multiplicand and a second input for receiving the successive sums delivered by the preceding section. This adder has a first sum output adapted to deliver the sums whose rank is less than or equal to n. Each elementary processing means then advantageously comprises said adder which includes a second sum output adapted to deliver said sum of rank n+1 and a duplexer having its input connected to the two outputs of the adder and its output connected to the output of the multiplier section. This duplexer is controlled by a control signal conditioned by a signal representing the start or the end of the binary word of the multiplicand.

In a first variant of the invention, in which the adder includes a carry output looped to a carry input through a carry time-delay circuit, said second sum output is the carry output, advantageously complemented as is the first sum output of said adder.

In a second variant of the invention, in which the adder also includes a carry output looped to a carry input through a carry time-delay circuit, the second sum output is separate from the first sum output and from the carry output. In a variant of this kind the adder includes six additional transistors compared to a conventional adder having only one sum output and one carry output, these additional transistors being divided into three pairs of complementary transistors.

To provide for multiplication by a negative multiplier coefficient, the last multiplier section includes a subtractor advantageously based on an adder as used in the preceding section or sections but whose first sum output is not complemented and whose second input, receiving the successive data from the preceding section, is complemented.

Other advantages and features of the invention emerge from the following detailed description of various non-limiting embodiments of the invention and the appended drawings.

DETAILED DESCRIPTION OF THE INVENTION

Figure 1:
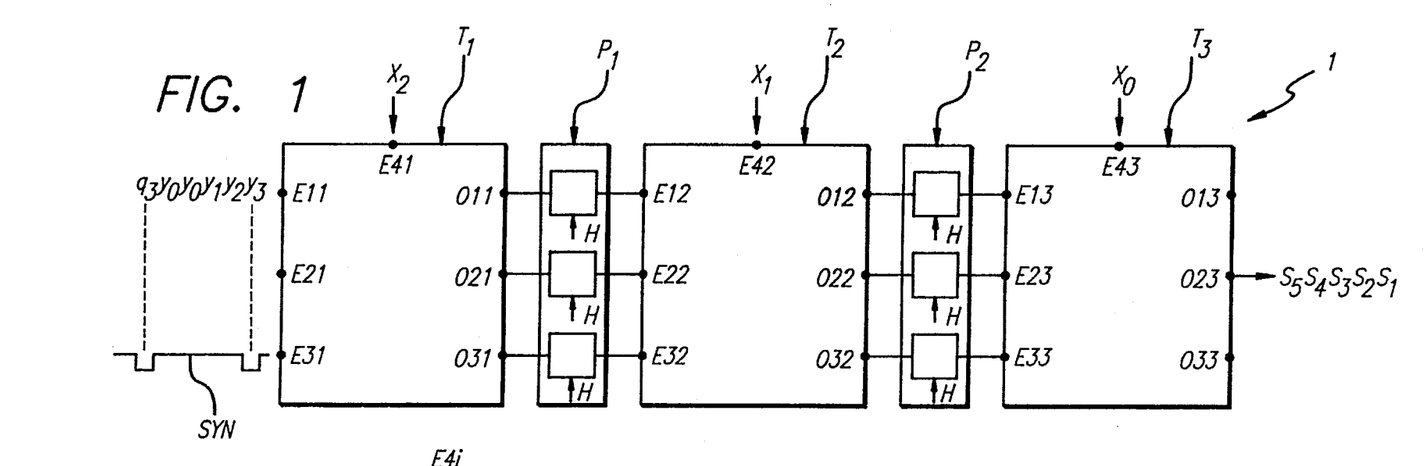
FIG. 1 is a diagram showing a prior art serial bit multiplier.
Figure 2:
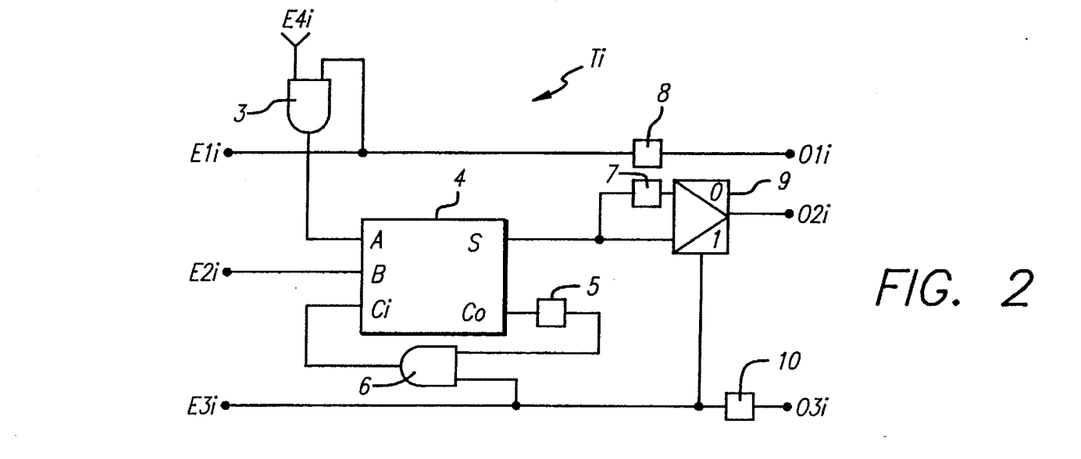
FIG. 2 shows a section of the multiplier from FIG. 1 in more detail.

FIGS. 1 and 2 show a multiplier of the type described in the aforementioned LYON article. The multiplier 1 of FIG. 1 here includes, for reasons of simplicity, three multiplier sections T1, T2, T3 connected in series by time-delay stages P1, P2 including one-bit time-delay circuits in the form of D-type flip-flops, for example, clocked by a clock signal H.

These intermediate time-delay stages P1, P2, etc confer upon the multiplier a "pipeline" architecture familiar to the man skilled in the art.

The first section T1 of the multiplier receives on one of its inputs E11 the multiplicand whose modulus is less than 1 and which is coded on n bits. In this example n=4. The most significant bit $y_0$ has been duplicated. In two's complement arithmetic the most significant bit $y_0$ is the sign bit. The first section T1 of the multiplier also receives at another input E31, known as the synchronization input, the signal SYN representing the start of the binary word of the multiplicand. In this instance the signal SYN is a synchronization word in which each change of state of one bit corresponds to the arrival of the least significant bit $y_3$ of the multiplicand. To be more precise, this word SYN is made up of a succession of streams of "1" bits separated by "0" bits coincident with the arrival of each least significant bit $y_3$, $q_3$ of the successive multiplicands.

Each section of the multiplier further receives on another input E41, E42, E43 one bit of a multiplier coefficient X whose modulus is less than 1. The first section receives the least significant bit, in this instance $x_2$ in the case of a multiplier coefficient on three bits; the last section receives the most significant bit $x_0$.

The result $S_5\ S_4\ S_3\ S_2\ S_1$ of multiplying the multiplicand $y_0\ y_0\ y_1\ y_2\ y_3$ by the multiplier coefficient $x_0\ x_1\ x_2$ is obtained at the output O23 of the last section T3 of the multiplier.

FIG. 2 shows one section Ti of the prior art multiplier in more detail. The successive bits of the multiplicand arrive at the input E1$i$ of the section, least significant bit first, and leave it via the corresponding output O1$i$ after passing through a one-bit time-delay circuit 8 clocked by a clock signal H. An AND gate 3 has an input connected to the input E4$i$ receiving the corresponding bit of the multiplier coefficient and an input connected to the input E1$i$. The logic gate 3 therefore produces the successive partial products of the corresponding bit of the multiplier coefficient by the successive bits of the multiplicand. The output of this logic gate 3 is connected to a first input A of an adder 4 whose second input is connected to the input E2$i$ of the section to receive the binary sums supplied by the adder of a preceding section.

The adder 4 also has a carry output Co looped to a carry input Ci by a "carry" time-delay circuit 5, also a one-bit circuit, and an AND gate 6. The other input of the AND gate 6 is connected to the synchronization input E3$i$ of the section Ti.

The sum output S of the adder, which supplies the sum of the three inputs A, B and Ci, is connected to a first input of a duplexer 9 by a one-bit time-delay circuit 7 and directly to the other input of the duplexer 9. The output of the duplexer is connected to the output O2$i$ of the section Ti. The control input of the duplexer 9 is also connected to the synchronization input E3$i$. Between the synchronization output O3$i$ and the synchronization input E3$i$ is a "synchronization" one-bit time-delay circuit 10.

Although the adder 4 is not indispensable for the first section T1 of the multiplier, as the value 0 is usually received at the input E21, it is nevertheless present in this section. Also, the man skilled in the art knows that if the multiplier coefficient is negative it is necessary to replace the adder 4 of the last section T3 with a subtractor. Also, the flip-flop 7 and the duplexer 9 are omitted in this last section.

The operation of the prior art multiplier is as follows: the man skilled in the art knows that adding two binary numbers A and B coded on n bits can produce a result S on n+1 bits given the carry R (see (I) in the appendix). Each adder 4 receives at its input $a_i$, $b_i$ and the carry $R_i$ and delivers at its sum output S the sum $S_i$ (see (II) in the appendix) and at its carry output Co the carry $R_{i+1}$. The sum of rank n+1 $S_{n+1}$, which is usually a function of $a_n$, $b_n$ and the carry $R_{n+1}$ (see (III) in the appendix), must be taken into account in the operations carried out in the adders of subsequent sections.

Consider now the multiplication of the multiplicand Y (coded on five bits $y_0$ $y_0$ $y_1$ $y_2$ $y_3$, with the most significant bit or sign bit $y_0$ duplicated), by the multiplier coefficient X coded on three bits $x_0$ $x_1$ $x_2$. $y_3$ and $x_2$ are respectively the least significant bits of the numbers Y and X (see (IV) in the appendix). At the start of multiplication using the first multiplicand all the registers (time-delay circuits) are at zero. The adder 4 of the first section T1, since the input B is at zero, successively delivers the successive partial products of the least significant bit $x_2$ of the multiplier coefficient X by the five bits of the multiplicand Y. Since the arrival of the least significant bit $y_3$ of the multiplicand coincides with the "0" of the synchronization word SYN, the partial product $x_2$ $y_3$ is not in fact delivered to the output O21 of this first section. Nevertheless, this partial product is shown in parentheses at (IV) in the appendix for easier understanding of the invention. In fact it is the content of the flip-flop 7, whose role is explained in detail below, which is delivered to the output O21 of the first section through the duplexer 9.

The successive partial products $x_2$ $y_2$, $x_2$ $y_1$, $x_2$ $y_0$ and $x_2$ $y_0$ are then successively delivered to the output S of the adder through the second channel of the duplexer 9 as the synchronization signal has the value "1". Since the second input of the logic gate 6 is at "1" the various carries are fed back into the input Ci of the adder, delayed by one clock period.

When the least significant bit $q_3$ of the next multiplicand arrives at the input E11 of the first section the synchronization signal SYN goes to "0" which switches the duplexer 9 to its first channel and delivers to the output O21 the content of the register 7 which represents the last partial product calculated $x_2 y_0$. This duplicates the most significant bit or sign bit $x_2 y_0$ of the binary word delivered by the adder 4. The elementary addition operation effected by the adder 4 and concerning the least significant bit $q_3$ of the next multiplicand is not disrupted by a carry from an operation effected using the preceding multiplicand Y since, at the same time as the least significant bit $q_3$ arrives, the second input of the logic gate 6 goes to "0" which prevents re-injection into the carry input Ci of the carry previously stored in the carry time-delay circuit (or register) 5.

In the next multiplier section T2 the logic gate 3 effects the successive partial products of the bit $x_1$ of the multiplier coefficient and the n bits (in this instance 5 bits) of the multiplicand, i.e. the partial products $x_1 y_3$, $x_1 y_2$, $x_1 y_1$, $x_1 y_0$ and $x_1 y_0$. The adder 4 of the section T2 calculates and delivers n (in this instance 5) sums of rank 1 through n obtained from the partial products of the bit in question (in this instance bit $x_1$) of the multiplier coefficient and the n bits of the multiplicand and from the corresponding partial products calculated for the preceding bit (in this instance the least significant bit $x_2$). To be more precise, the adder 4 delivers the sum of rank 1, $s_1$, equal to $x_1 y_3 + x_2 y_2$, the sum of rank 2, $s_2$, equal to $x_1 y_2 + x_2 y_1$, the sum of rank 3, $s_3$, equal to $x_1 y_1 + x_2 y_0$, the sum of rank 4, $s_4$, equal to $x_1 y_0 + x_2 y_0$, and the sum of rank 5, $s_5$, equal to $x_1 y_0 + x_2 y_0$.

By analogy with the operation of the section T1, the sum of rank 1, $s_1$, is not delivered at the output O22 of this section T2 as it coincides with the appearance of the "0" bit of the synchronization signal, the effect of which is to deliver at the output O22 the content of the register 7 which corresponds to the sum of rank n+1 associated with the preceding multiplicand.

The man skilled in the art will know that the sum of rank n (in this instance the sum of rank 5, $s_5$) is simultaneously delivered to the output O22 of this section T2 and stored in the register 7. On the appearance of the "0" bit of the synchronization signal coincident with the arrival of the least significant bit $q_3$ of the next multiplicand, the sum of rank 5, $s_5$, is again delivered to the output O22 of this section T2 and then corresponds to the sum of rank n+1. Simultaneously with this delivery of the sum of rank n+1, the calculation in this second section using the least significant bit $q_3$ of the next multiplicand is carried out and is not affected by the carry previously stored in the register 5 because the second input of the logic gate 6 goes to "0".

The man skilled in the art will note that in this prior art multiplier the addition in the adder of a section is effected on n bits (five bits in this instance). The sums of ranks 1 through 5 are actually calculated. Nevertheless it is necessary to use the sum of rank n+1 in the adder of the next section. However, this sum of rank n+1 is not actually calculated here. In fact it corresponds to the sum of rank n which is simply duplicated by means of the duplexer 9 and the register 7. Obtaining the sum of rank n+1 by duplicating the sum of rank n here yields an exact result because of the duplication of the sign bit $y_0$ of the multiplicand.

The operation just described for the second section T2 is identical for the subsequent sections. Regarding the final section (in this example section T3), the last adder or subtractor calculates the sums $S_1$ through $S_5$ of ranks 1 through 5 obtained from the partial products of the most significant bit of the multiplier coefficient and the n bits of the multiplicand and from the successive sums $s_2$, $s_3$ $s_4$ $s_5$ and $s_5$ associated with the preceding bit.

The sum of rank $S_1$ is here supplied by the adder of the section T3, unlike the sum $s_1$ and the partial product $x_2 y_3$, since the duplexer 9 and the flip-flop 7 are omitted. There is no utility in duplicating again the sign bit $S_5$ since this is at the end of the calculation and outputting an additional bit $S_1$ (in this example the least significant bit) retains the accuracy. The final result of the multiplication is thus a binary word coded on five bits $S_5$ $S_4$ $S_3$ $S_2$ $S_1$. $S_3$ $S_2$ $S_1$ represent the "data" bits of the result while $S_5$ and $S_4$ are equal and represent the duplicated sign bit.

Figure 3:
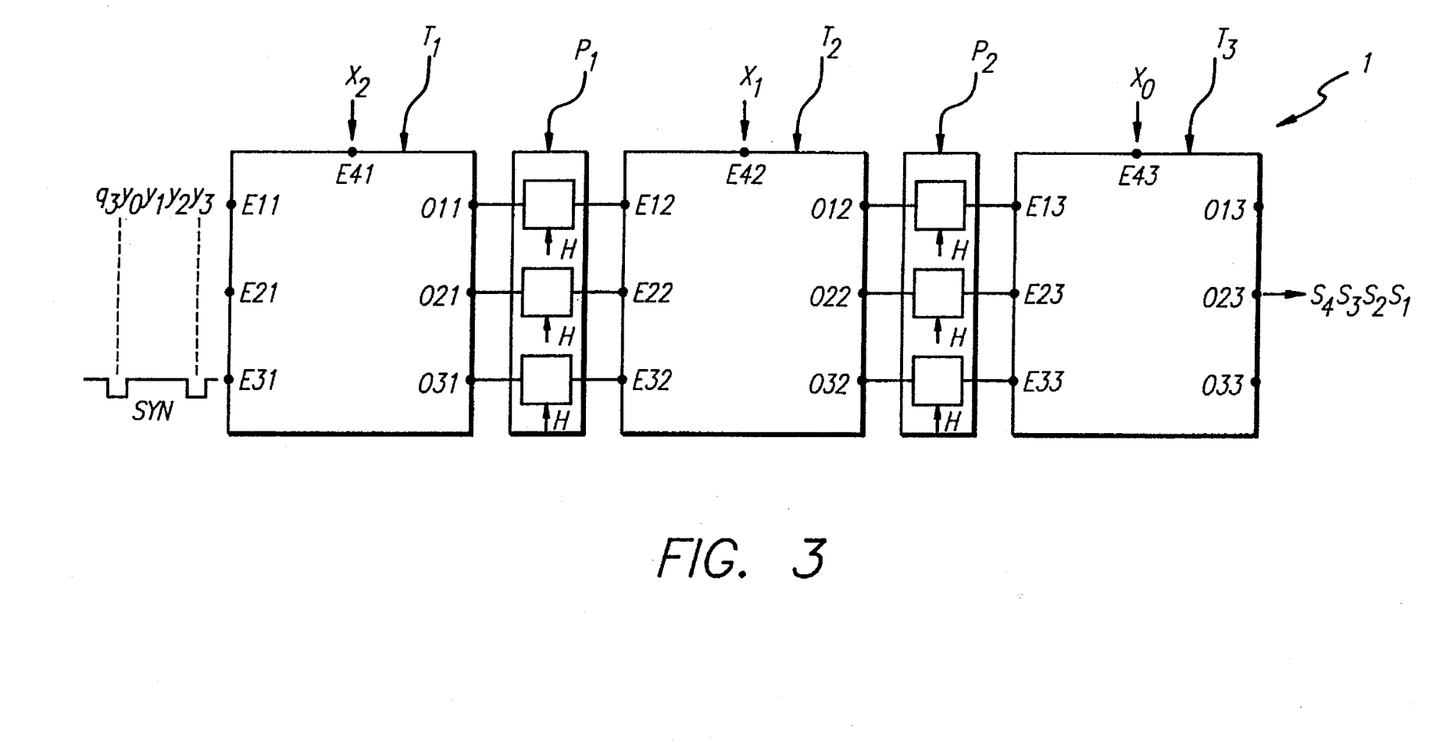
FIG. 3 is a diagram showing a serial bit multiplier according to the invention.

The multiplier according to the invention, which is advantageously hardwired, i.e. manufactured from discrete components incorporated in an integrated circuit 11 shown in a highly diagrammatic manner in FIG. 3 eliminates the need to duplicate the sign bit $y_0$ of the multiplicand at the input E11 of the first section of the multiplier. This saves one data bit enabling the use of smaller registers than those used with a prior art multiplier. For simplicity the same reference numbers are used again in FIG. 3 for the main functional units of the multiplier. Each multiplicand, for example the multiplicand Y in this instance, is coded on four bits, including the sign bit, and the corresponding result $S_4$ $S_3$ $S_2$ $S_1$ is also coded on four bits including the sign bit $S_4$. This time the synchronization signal SYN is a succession of streams of "1" bits separated by "0" bits coinciding with the most significant bits, in this instance the bits $y_0$ on the successive multiplicands. In other words, here the synchronization word delimits the end of the binary word of the multiplicand.

Figure 4:
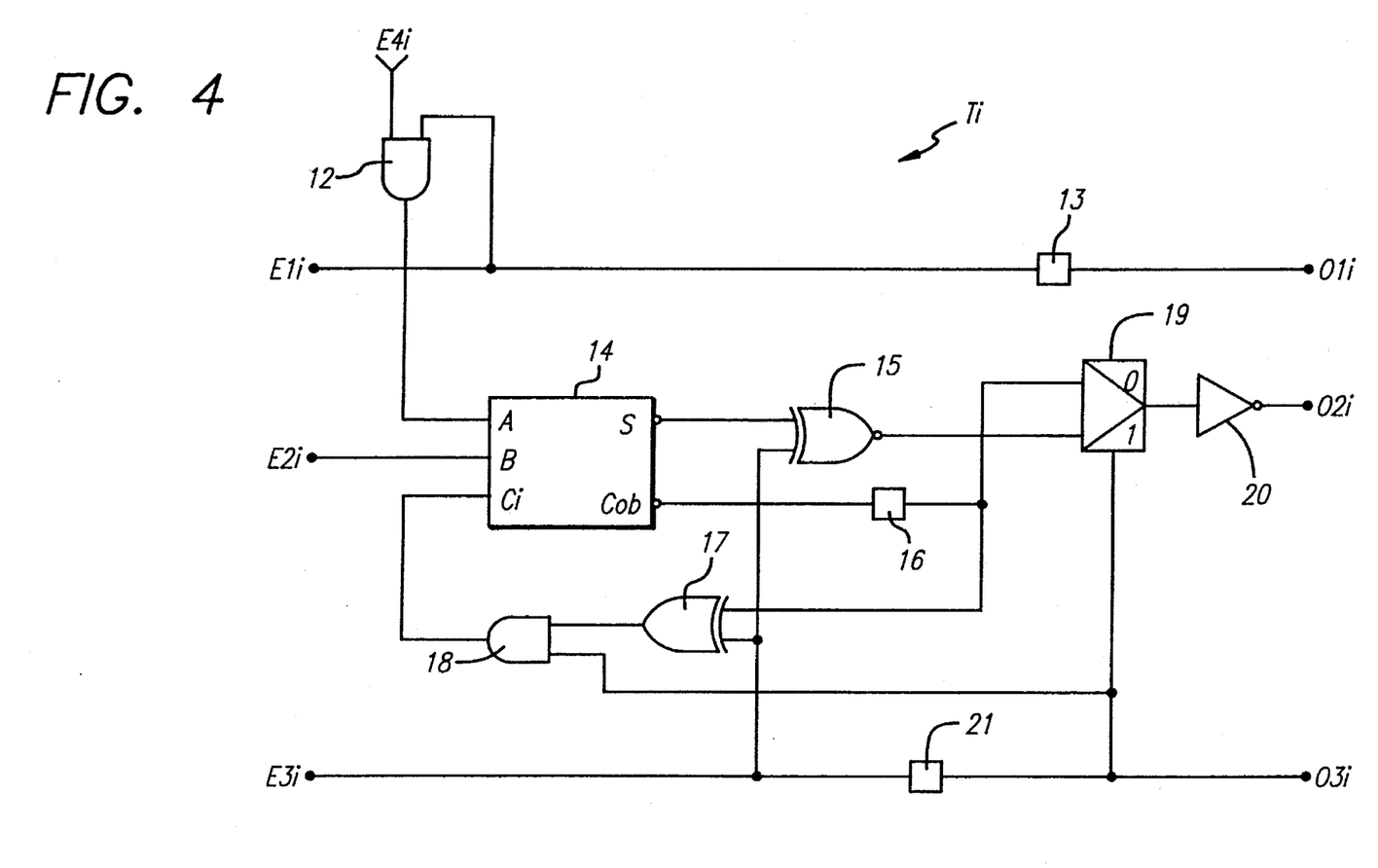
FIG. 4 shows in more detail a first embodiment of a section of the multiplier from FIG. 3.

FIG. 4 shows in more detail an intermediate multiplier section Ti of the multiplier 11 from FIG. 3. The time-delay circuit or register 13 between the input E1$i$ and the output O1$i$ of the successive bits of the multiplicand is similar to the register 8 from FIG. 2. Likewise the synchronization time-delay circuit 21, relative to its counterpart register 10 in FIG. 2, and the carry time-delay circuit 16 relative to its counterpart register 5 in FIG. 2. Similarly, the AND gate 12 is similar to the logic gate 3 of the FIG. 2 multiplier.

The adder 14 of the section Ti of the multiplier according to the invention is modified at its sum output and its carry output Sb and Cob, respectively, in that these two outputs are complemented. This modification can be achieved simply by adding an inverter at the sum and carry outputs of a conventional adder. In more concrete terms, and with reference to the equation (V) in the appendix, the output Sb corresponds to the complemented sum of the three inputs A, B and Ci and delivers the complemented sum of rank i when the bits $a_i$, $b_i$ and $R_i$ are present at the inputs A, B and Ci. Likewise, the complemented carry of rank i+1 is delivered at the output Cob simultaneously with the delivery of the complemented sum of rank i.

The sum output Sb of the adder 14 is connected to an input of a NOT-exclusive-OR gate 15 whose output is connected to one input of a duplexer 19. The other input of the logic gate 15 is connected to the synchronization input E3$i$ of the section Ti, and therefore to the input side of the synchronization time-delay circuit 21. The output of the carry time-delay circuit 16, the input of which is connected to the complemented carry output Cob of the adder 14, is connected to the other input of the duplexer 19 and to a first input of an exclusive-OR gate 17. The second input of the logic gate 17 is also connected to a synchronization input E3$i$. The output of the logic gate 17 is connected to an input of an AND gate 18 whose output is connected to the carry input Ci of the adder 14. The other input of the logic gate 18 is connected to the synchronization output O3$i$ and thus to the output of a synchronization time-delay circuit 21. The control input of the duplexer 19 is also connected on the downstream side of the synchronization time-delay circuit 21.

The output of the duplexer 19 is connected to the output O2$i$ of the section Ti through an inverter 20.

As explained in more detail below, and in order among other things not to penalize the precision of the final calculation, the last multiplier section does not include any multiplexer 19. The output of the logic gate 15 is then connected to the output O2 via only the inverter 20. Of course, in this case the combination of the logic gate 15 and the inverter 20 could be replaced by an equivalent logic gate.

Consider now the operation of this multiplier on multiplying a multiplicand Y coded on four bits $y_0$, $y_1$, $y_2$, $y_3$, where $y_3$ is the least significant bit and $y_0$ is the sign bit, by a multiplier coefficient X coded on three bits $x_0$, $x_1$, $x_2$ where $x_2$ is the least significant bit. Here X and Y have a modulus less than 1.

For reasons of simplification, reference is also made to (VI) in the appendix and to the operation of an intermediate section Ti of the multiplier, for example the second section.

The logic gate 12 successively produces the partial products $x_1y_3$, $x_1y_2$, $x_1y_1$, $x_1y_0$ of bit $x_1$ of the multiplier coefficient and the n (here 4) bits of the multiplicand. The sum output of the adder 14 therefore successively delivers the sums of rank 1, $s_1$ of rank 2, $s_2$, of rank 3, $s_3$ and of rank 4, $s_4$ as defined at (VI) in the appendix. With regard to the calculation of the sums $s_2$ and $s_3$, the synchronization signal present at the input E3$i$ is equal to 1 as is the control signal of the duplexer 19. Consequently, the logic gate 17 has the value 1 at one of its input and behaves as an inverter whereas the logic gate 15 transmits without modifying it the value delivered by the output Sb of the adder 14. Also, since the second input of the logic gate 18 is also at 1, the complemented carry delivered by the output Cob of the adder can be fed back to the carry input Ci via the time-delay register 16. Because the logic gate 17 behaves as an inverter, it is in fact an uncomplemented carry which is fed back to the carry input Ci of the adder 14. Consequently, the sum of rank 2 or 3 is delivered in complemented form at the output Sb of the adder but is in fact delivered in non-complemented form at the output O2$i$ of the multiplier section via the second channel of the duplexer 19 and the inverter 20.

At the time of calculation of the partial product $x_1y_3$ and of the sum of rank 1, $s_1$, the synchronization signal is at 1 on the input side of the synchronization time-delay circuit 21 but at 0 on the output side of this circuit 21 since the arrival in the section Ti of the least significant bit of the multiplicand in fact follows the most significant bit of the preceding multiplicand. Thus because the duplexer 19 is switched to its upper channel by the action of the control signal at 0, it is the content of the carry time-delay register 16 which is delivered at the output of the duplexer rather than the sum $s_1$. Nevertheless, the calculation of this sum of rank 1 is not disturbed by the content of the carry register 16 which held the carry of the preceding calculation concerning the last bit of the preceding multiplicand given the 0 value assigned to the second input of the logic gate 18.

When the most significant bit or sign bit $y_0$ of the multiplicand Y arrives, the synchronization signal goes to 0 on the input side of the synchronization time-delay circuit 21, whereas it is still at 1 on the downstream side of this circuit 21. The logic gate 15 therefore behaves as an inverter whereas the logic gate 17 transmits without modifying it the content of the carry register 16.

During this calculation the adder 14 simultaneously calculates the sum of rank n (in this instance the sum of rank 4, $s_4$) and the sum of rank n+1 (here the sum of rank 5, $s_5$). We have noticed that, although the carry of rank n+1, $R_{n+1}$, is the result of the majority function of the three bits $a_n$, $b_n$ and $R_n$ respectively present at the three inputs A, B and Ci of the adder 14, the sum $S_{n+1}$ of rank n+1 is equal to the majority function of the three bits $a_n$, $b_n$ and the complemented carry of rank n, $\overline{R}_n$ (equations (VII) and (VIII) in the appendix). Also, the result of the majority function is obtained at the carry output of the adder.

Thus to calculate the sum $s_4$ of rank 4, i.e. when the partial product $x_1y_0$ is present at the input A and the partial product $x_2y_0$ is present at the input B, it is in fact the uncomplemented content of the carry register 16 which is present at the carry input Ci of the adder 14, i.e. the complemented carry of rank 4, $R_4$. Consequently, the complemented sum output Sb of the adder 14 delivers the sum $s_4$ of rank 4 which is complemented a first time on passing through the logic gate 15 and then complemented a second time on passing through the inverter 20 to be delivered at the output O2$i$ of the section Ti.

At the same time as calculating this sum $s_4$, the adder calculates the sum of rank n+1, in this instance the sum $s_5$, and delivers it in complemented form to the output Cob of the adder 14 to be stored in the carry time-delay register 16. This output of rank n+1 is delivered in uncomplemented form on the next clock pulse, i.e. on the arrival of the least significant bit of the next multiplicand, via the other channel of the duplexer 19 controlled by the synchronization signal then equal to 0 on the output side of the synchronization time-delay circuit 21 and through the intermediary of the inverter 20.

The man skilled in the art will therefore note that the sum of rank n+1 (in this instance the sum of rank 5, $s_5$) is actually calculated at the adder 14 of the intermediate multiplier section Ti. In other words, the addition is effected on n+1 bits (5 bits in this instance) for a multiplicand coded and signed on 4 bits, unlike the prior art multiplier in which the addition was actually effected on n bits with the nth bit duplicated to obtain the sum of rank n+1. Although in the prior art multiplier this duplication was effected on the basis of the signal extracted from the sum output of the adder, the calculation of the sum of rank n+1 in the multiplier according to the invention is effected on the basis of the signal obtained from the carry output of the adder. Finally, note that the calculation of the sum of rank n+1, effected on the basis of the complemented carry of rank n, is effected simultaneously with the calculation of the sum of rank n.

The final result of the multiplication, $S_4 S_3 S_2 S_1$, available at the output of the last section of the multiplier is therefore coded on four bits with bit $S_4$ as the sign bit. The two bits $x_2y_3$, $s_1$ shown in parentheses at (VI) in the appendix are not delivered by the multiplier as previously explained because of the duplexer in each section, this omission not disrupting the final result, among other things because of the presence of the AND gate connected between the output and the carry input of each adder.

Because the duplexer is omitted from the last section, the bit $S_1$ is actually delivered at the output of the multiplier in order to conserve the 3-bit accuracy of the result, whereas the sum of rank n+1, $S_5$ is not delivered, which has no effect on the result since, firstly, internal overflow has been avoided in the intermediate sections and, secondly, this is at the end of the calculation with a result whose modulus is less than 1 and in which $S_4$ consequentially represents the sign bit.

With regard to the first section T1 of this multiplier, the sum of rank "5", here simply equal to the partial product $x_2y_0$, is calculated in the same manner as previously described. However, the man skilled in the art will understand that in the case of the first section this "sum" amounts to duplication of the sign bit $x_2y_0$. Accordingly, it is not indispensable for the first section of the multiplier to have an architecture comparable to that of subsequent sections. It would be feasible to use an architecture comparable to that of the prior art multiplier in order simply to duplicate the sign bit.

Figure 5:
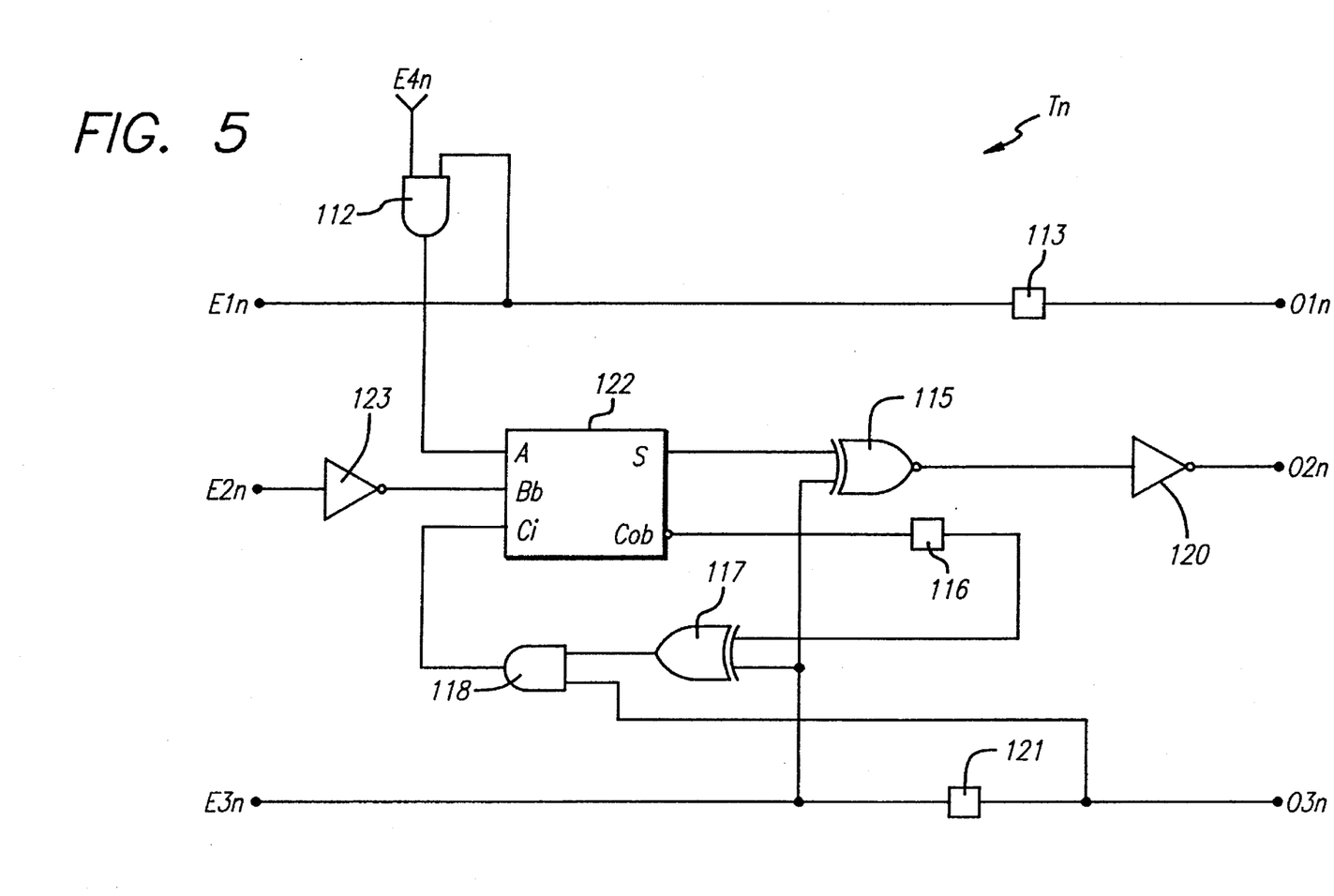
FIG. 5 shows in more detail one embodiment of the last section of the multiplier from FIG. 3.

As previously explained, if the multiplier coefficient is negative, the last section of the multiplier must include a subtractor in place of an adder. FIG. 5 shows a section Tn of this kind in which analogous components having functions analogous to those shown in FIG. 4 have their reference number increased by 100 relative to those used in FIG. 4. Only the differences between these two figures are described.

The subtractor 122 is very simply implemented (in application of the general formula (IX) for subtracting two numbers U and V) on the basis of the adder 14 of a preceding section by not complementing the sum output S of this adder 122 and, conversely, by complementing the second input B of this adder 122, i.e. the input receiving the successive sums delivered by the preceding section. The section input Bb can be complemented by including an inverter 123 between the input E2n and the adder 122. As explained above, the duplexer is omitted and the time-delay register 116 is simply looped to the carry input by the gates 117 and 118.

Figure 6:
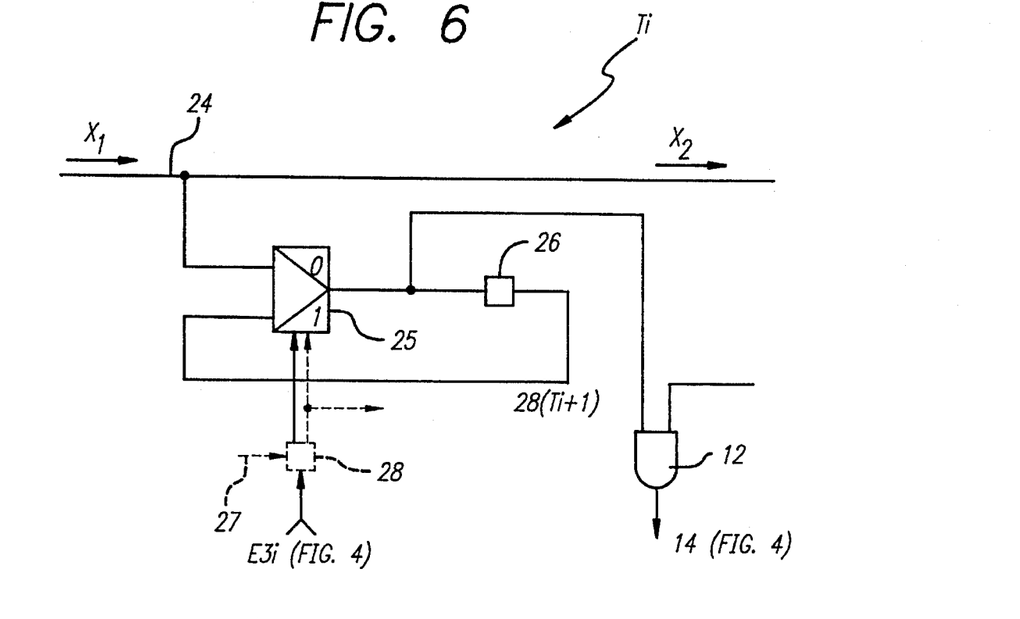
FIG. 6 is a diagram showing another part of a multiplier section according to the invention.

To enable the multiplier to be fed with the bits of the multiplier coefficient serially, each multiplier section Ti advantageously includes the means shown in FIG. 6.

These means include a duplexer 25 one input of which is connected to the serial bus 24 conveying the bits $x_0 x_1 x_2$ of the multiplier coefficient. The output of this duplexer 25 is looped by a one-bit time-delay circuit 26 such as a D-type flip-flop to the second input of the duplexer 25. The output of the duplexer 25, i.e. the input of the circuit 26, is connected to one input of the AND gate 12. The control input of the duplexer 25 is connected to the synchronization input E3i of the section Ti.

Assuming, for example, that the means shown in FIG. 6 are assigned to the second section T2 of the multiplier associated with the bit $x_1$ of the multiplier coefficient, in the presence of a 0 value bit of the synchronization signal SYN coinciding with the arrival of the bit $x_1$ of the multiplier coefficient the latter is injected by the duplexer 25 into the input of the logic gate 12 in order to produce the first partial product of this bit $x_1$ with the least significant bit of the multiplicand. This bit $x_1$ remains in the duplexer loop by virtual of the register 26 for calculation of the subsequent partial products, up to loading of a bit $x_1$ of a new multiplier coefficient, or the same coefficient, arriving on the bus 24, on the occurrence of the next 0 bit of the synchronization signal. Of course, the man skilled in the art will have understood that in this variant it is necessary to complete the binary word of the multiplier coefficient so that this binary word is the same length as that of the multiplicand, in order to be certain of producing the correct partial products in the correct sections.

Nevertheless, such means for loading the bits of the multiplier coefficient enable, subject to the use of another synchronization signal 27 and a time-delay register 28 receiving this synchronization signal 27 and delivering it at its output, firstly, to the control input of the duplexer 25 and, secondly, to the input of the time-delay register 28 of the next section, loading once only of the bits of the multiplier coefficient, without it being necessary to complete the binary word of the multiplier coefficient. It is a simple matter to ensure that the synchronization signal 27 is used once only to load once and for all the bit $x_1$ into the time-delay register 26 and that the synchronization signal from the synchronization input of the section is used to time the multiplier section (rather than to control the duplexer 25) in order to calculate the corresponding partial products. In this regard, the signal 27 can be a separate synchronization signal but one that is "locked" to that from the synchronization input and usable once only or the signal from the synchronization input used once only at the appropriate time to control the duplexer 25.

Figure 7:
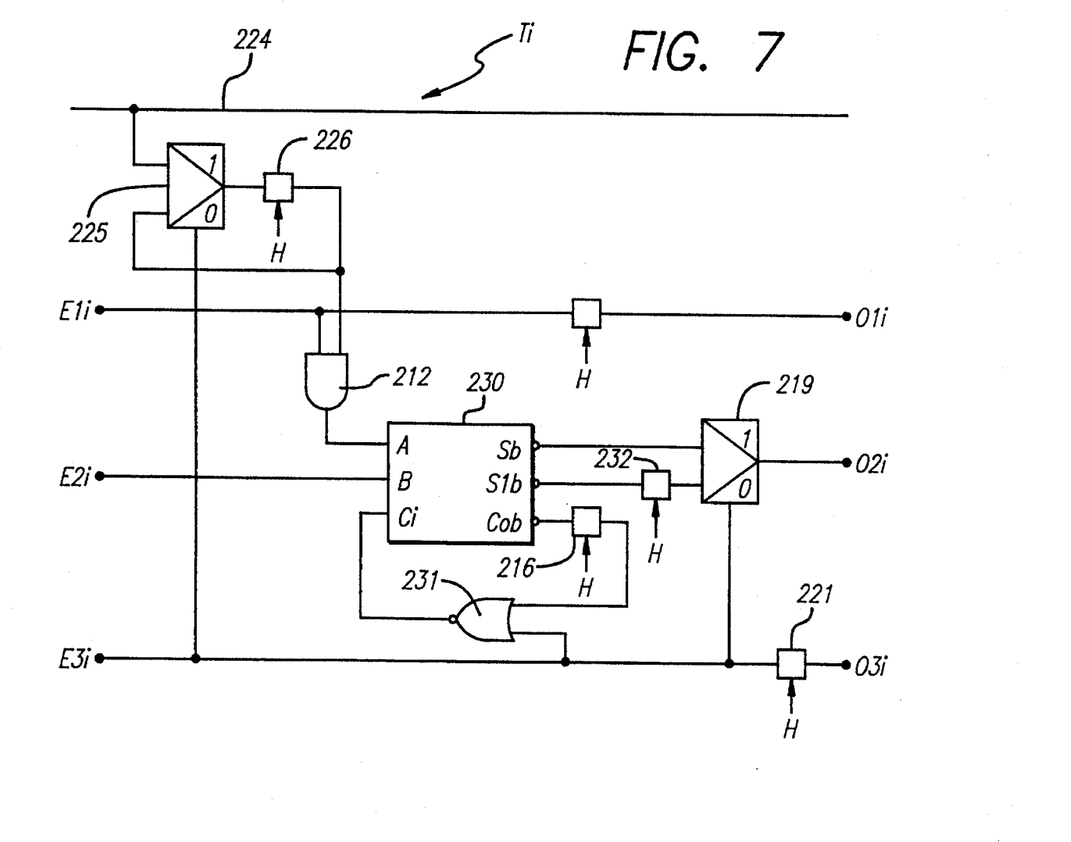
FIG. 7 is a diagram showing another embodiment of a section of the multiplier from FIG. 3.

As an alternative, according to the invention it is possible to use for each multiplier section Ti including an adder the embodiment shown in FIG. 7. In this figure similar components and components having similar functions to those shown in FIGS. 4 and 6 have reference numbers increased by 200 relative to those used in these figures. Only the differences between FIGS. 4 and 6, on the one hand, and FIG. 7 on the other hand, are described.

In this embodiment the adder 230 includes, in addition to the three inputs A, B and Ci and the complemented carry output Cob, a first sum output Sb analogous to the sum output of the adder 14 of FIG. 4, adapted to deliver the sums of rank 1 through n, and a complemented second sum output S1b adapted to deliver the sum of rank n+1.

The first sum output Sb is connected direct to a first input of the duplexer 219. The second sum output S1*b* is connected to the other input of the duplexer via an auxiliary time-delay register 232. The output of the duplexer 219 is connected direct to the output O2*i* of the section.

The AND gate 18 of FIG. 4 is here replaced with a NOR gate 231 having one input connected to the output of the carry time-delay register 216 and the other input connected to the synchronization input E3*i* on the upstream side of the synchronization time-delay register 221. The control input of the duplexer 219 is also connected on the input side of the time-delay register 221.

With reference to the AND gate 212 adapted to produce the successive partial products, one of its inputs is connected to the output of the time-delay register 226 receiving the corresponding bit of the multiplier coefficient rather than to the input of this time-delay register as in FIG. 6.

Subject to a synchronization signal now comprising a succession of streams of "0" bits spaced by "1" bits coincident with the least significant bits of the successive multiplicands, the operation of a multiplier section of this kind is similar to that previously described with reference to FIGS. 4 and 6.

Figure 8:
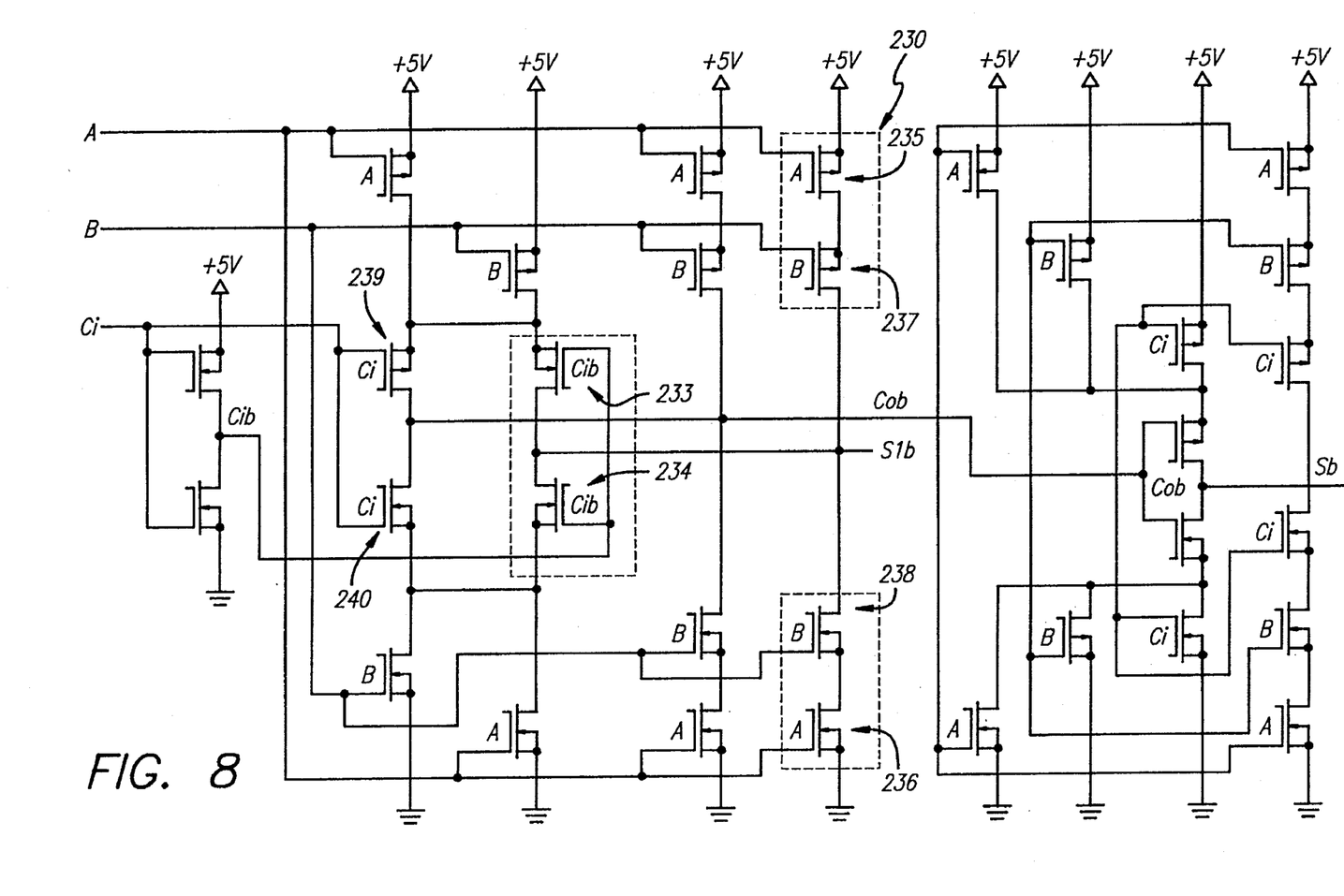
FIG. 8 shows in more detail the adder of the multiplier section shown in FIG. 7.

This embodiment dispenses with the exclusive-OR gate 17 and the NOT-exclusive-OR gate 15 of FIG. 4 and the adder 230 can be easily implemented on the basis of a conventional adder having only one sum output and one carry output, subject to the provision of only six additional transistors, as shown in more detail in FIG. 8.

The shaded areas in this figure refer to the six additional transistors.

These additional transistors are divided into three auxiliary pairs of complementary transistors. The first auxiliary pair of field-effect transistors 233, 234 is connected in parallel with a first pair of complementary transistors 239, 240 the gates of which are connected to the carry input Ci and the common sources of which are connected to the complemented carry outputs Cob. The common sources of the two transistors 233 and 234 of this first auxiliary pair are connected to the complemented second sum output S1*b*.

The gates of the complementary transistors 235 and 236 of the second auxiliary pair are connected to a first input of the adder, input A in this instance, and the gates of the complementary transistors 237 and 238 of the third auxiliary pair are connected to the second input of the adder, input B in this instance.

The source of each transistor 235 (236) of the second pair is connected to the drain of its counterpart transistor 237 (238) of the third auxiliary pair. The sources of the transistors 237, 238 of the third auxiliary pair are connected together to the complemented sum output S1*b*.

The drain of the transistor 235 of the second auxiliary pair is connected to the power supply of the adder. The drain of the complementary transistor 236 of this pair is connected to ground.

Appendix $$\begin{bmatrix} R: & R_n R_{n-1} \ldots R_i \ldots R_2 \\ A: & a_n a_{n-1} \ldots a_i \ldots a_2 a_1 \\ B: & b_n b_{n-1} \ldots b_i \ldots b_2 b_1 \\ \\ S: & S_{n+1} S_n S_{n-1} \ldots S_i \ldots S_2 S_1 \end{bmatrix} \quad (I)$$

$$S_i = a_i + b_i + R_i \quad (II)$$

-continued
Appendix $$S_{n+1} = f(a_n, b_n, R_{n+1}) \quad (III)$$

(IV)
$$\begin{array}{cccccc} y_0 & y_0 & y_1 & y_2 & y_3 & : Y \\ & x_0 & x_1 & x_2 & & : X \end{array}$$

$$\begin{array}{llllll} x_2y_0 / x_2y_0 \; x_2y_0 \; x_2y_1 \; x_2y_2 & (x_2y_3) & : \text{adder T1} \\ x_1y_0 & x_1y_0 \; x_1y_1 \; x_1y_2 \; x_1y_3 \end{array}$$

$$\begin{array}{lllllll} s_5 \; / \; s_5 & s_4 & s_3 & s_2 & (s_1) & (x_2y_3) & : \text{adder T2} \\ x_0y_0 \; x_0y_0 \; x_0y_1 \; x_0y_2 \; x_0y_3 \end{array}$$

$$\begin{array}{lllllll} S_5 & S_4 & S_3 & S_2 & S_1 & (s_1) & (x_2y_3) & : \text{adder T3} \end{array}$$

$$Sb = A + B + Ci = a_i + b_i + R_i = S_i \quad (V)$$

(VI)
$$\begin{array}{ccccc} y_0 & y_1 & y_2 & y_3 & : Y \\ x_0 & x_1 & x_2 & & : X \end{array}$$

$$\begin{array}{llllll} x_2y_0/x_2y_0 \; x_2y_1 \; x_2y_2 & (x_2y_3) & : \text{adder T1} \\ x_1y_0 \; x_1y_1 \; x_1y_2 \; x_1y_3 \end{array}$$

$$\begin{array}{lllllll} s_5 \; / \; s_4 & s_3 & s_2 & (s_1) & (x_2y_3) & : \text{adder T2} \\ x_0y_0 \; x_0y_1 \; x_0y_2 \; x_0y_3 \end{array}$$

$$\begin{array}{llllll} S_4 & S_3 & S_2 & S_1 & (s_1) & (x_2y_3) & : \text{adder T3} \end{array}$$

$$R_{n+1} = \text{Maj}(a_n, b_n, R_n) \quad (VII)$$

$$S_{n+1} = \text{Maj}(a_n, b_n, \overline{R_n}) \quad (VIII)$$

$$U - V = \overline{\overline{U} + V} \quad (IX)$$

There is claimed:

1. Multiplier for least significant bit first multiplication of a multiplicand coded on n bits by a multiplier coefficient, said multiplier comprising processor means adapted for each bit of the decimal part of said multiplier coefficient between said least significant bit and a most significant bit to actually calculate the sum of rank n+1 obtained from partial products of said bit in question and the n bits of said multiplicand and from corresponding sums calculated for the preceding bit or bits of said multiplier coefficient, wherein said processor means comprises calculation means for calculating successive carries associated with sums of successive ranks, and wherein said processor means calculates, for each bit in question of the multiplier coefficient, the sum of rank n+1 from a complemented carry of rank n, in order to prevent internal overflow of said multiplier.

2. Multiplier according to claim 1 wherein said multiplier coefficient has a modulus of less than 1 and said processor means calculates said sum of rank n+1 for each bit of said multiplier coefficient between said least significant bit and said most significant bit.

3. Multiplier according to claim 1 wherein said multiplicand has a modulus less than 1.

4. Multiplier according to claim 1 implemented as a serial bit multiplier including a plurality of successive multiplier sections connected in series, each multiplier section being adapted to receive a predetermined bit of said multiplier coefficient and all bits of said multiplicand in succession, in which multiplier said processor means include elementary processor means respectively incorporated at least into intermediate multiplier sections of said multiplier and adapted to calculate said sum of rank n+1 for the respective predetermined bit of said multiplier coefficient, and wherein said calculation means includes elementary calculation means, incorporated in at least each intermediate multiplier section, for calculating successive carries associated with the sums of successive rank and each elementary processor means is adapted to calculate the respective sum of rank n+1 from the complemented carry of rank n.

5. Multiplier according to claim 4 wherein said elementary processor means of each section comprises an adder having a first input adapted to receive successive partial products of a bit of said multiplier coefficient associated with a corresponding multiplier section by the bits of said multiplicand and a second input for receiving the successive sums delivered by a preceding multiplier section, said adder has a first sum output adapted to deliver the sums of rank less than or equal to n, and each elementary processor means comprises said adder which further has a second sum output adapted to deliver said sum of rank n+1, and a duplexer having an input connected to said two outputs of said adder and an output connected to an output of said corresponding multiplier section, said duplexer being controlled by a control signal whose occurrence is conditional on that of a signal representing the start or the end of the binary word of the multiplicand.

6. Multiplier according to claim 5 wherein said adder has a carry output looped to a carry input by a carry time-delay circuit and said second sum output is the carry output.

7. Multiplier according to claim 7 wherein a first section of said multiplier has a synchronization input for receiving a synchronization word in which each change of state of one bit corresponds to the arrival of the most significant bit of said multiplicand at the input of said first section of said multiplier, each multiplier section includes a synchronization time-delay circuit between an input and a corresponding synchronization output, the synchronization output of a multiplier section being connected to the synchronization input of a next multiplier section, the carry output and the first sum output of said adder are complemented, said elementary processor means of each multiplier section includes, in addition to said time-delay circuit connected to said complemented carry outputs:

an exclusive-OR gate having one input connected to an output of said carry time-delay circuit and another input connected to the synchronization input of said multiplier section and one output connected to one input of an AND gate whose output is connected to said carry input of said adder; and a NOT-exclusive-OR gate having one input connected to the complemented first sum output of said adder, another input connected to the synchronization input of said multiplier section and an output connected to an input of said duplexer, the other input of said duplexer is connected to the output of said carry time-delay circuit, the output of said duplexer is connected to the output of said multiplier section by an invertor, and a control input of said duplexer and another input of said AND gate are connected to the output of said synchronization time-delay circuit.

8. Multiplier according to claim 5 wherein said adder has a carry output looped to a carry input through a carry time-delay circuit and said second sum output is separate from said first sum output and from said carry output.

9. Multiplier according to claim 8 wherein a first section of said multiplier has a synchronization input at which each change of state of one bit corresponds to the arrival of the least significant bit of said multiplicand at the input of said first multiplier section of said multiplier, each multiplier section of said multiplier includes a synchronization time-delay circuit between an input and a corresponding synchronization output, the synchronization output of a multiplier section being connected to the synchronization input of a next multiplier section, three outputs of said adder are complemented, said elementary processor means include an auxiliary time-delay circuit between said second sum output and one input of said duplexer, another input of said duplexer being connected direct to said first sum output, and a NOR gate whose output is connected to the carry input of said adder and one input of which is connected to the output of said carry time-delay circuit, and a control input of said duplexer and another input of said NOR gate are connected to the synchronization input of said multiplier section.

10. Multiplier according to claim 8 wherein said adder includes six additional transistors compared to an adder having only one sum output and one carry output, said additional transistors being divided into three auxiliary pairs of complementary transistors.

11. Multiplier according to claim 10 wherein the first auxiliary pair is connected in parallel with a first pair of complementary transistors whose gates are connected to the carry input of said adder and whose common sources are connected to said carry output, said common sources of said two transistors of said first auxiliary pair being connected to said second sum output, the gates of the transistors of said second auxiliary pair are connected to a first input of said adder and the gates of the transistors of said third auxiliary pair are connected to a second input of said adder, the source of each transistor of said second auxiliary pair is connected to the drain of the counterpart transistor of said third auxiliary pair, the sources of the transistors of said third auxiliary pair being connected together to the complemented second sum output of said adder.

12. Multiplier according to claim 4 wherein each multiplier section includes a duplexer having one input adapted to receive the corresponding bit of said multiplier coefficient and the other input looped to the output of said duplexer by a time-delay circuit, the output of said duplexer is connected to one input of an AND gate and said duplexer is controlled by a control signal enabling loading once and for all of a corresponding bit of said multiplier coefficient into said time-delay circuit.

13. Multiplier according to claim 4 wherein a last section of said multiplier includes a subtractor derived from an adder as used in preceding sections of which a first sum output is not complemented and a second input is complemented.

14. Method for preventing internal overflow of a multiplier connected to a data transmission medium and adapted to carry out least significant bit first multiplication of a multiplicand coded on n bits with a multiplier coefficient, in which method, for each bit of the decimal part of the multiplier coefficient between the least significant bit and the most significant bit, there is calculated in said multiplier the sum of rank n+1 obtained from partial products of said bit in question with the n bits of said multiplicand and from corresponding sums calculated for the preceding bit or bits of said multiplier coefficient, and wherein the sum of rank n+1 is calculated for each bit in question of said multiplier coefficient from the complemented carry of rank n.

15. Method according to claim 14 wherein the multiplier is supplied with a multiplier coefficient having a modulus less than 1 and said sum of rank n+1 is calculated for each bit of said multiplier coefficient between said least significant bit and said most significant bit.

16. Method according to claim 14 or claim 15 wherein said multiplier is supplied with a multiplicand having a modulus of less than 1.

17. Method according to claim 14 wherein said sum of rank n+1 and a sum of rank n are calculated simultaneously.

* * * * *